Figure 1:
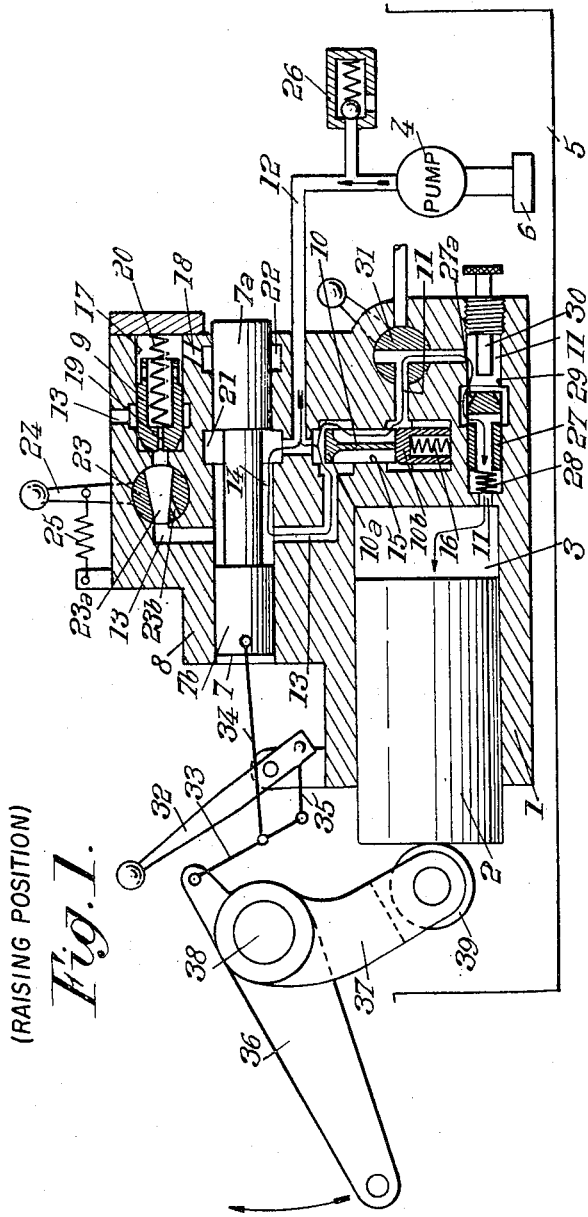

Dec. 20, 1960 V. POMPER ET AL 2,964,908
HYDRAULIC CONTROL SYSTEMS FOR AGRICULTURAL MACHINES
Filed March 18, 1960 4 Sheets-Sheet 1

INVENTOR
Victor Pomper
Robert Gauthier
Louis Pignolet
BY
Bailey, Stephens, o'Huelley
ATTORNEYS Dec. 20, 1960 V. POMPER ET AL 2,964,908
HYDRAULIC CONTROL SYSTEMS FOR AGRICULTURAL MACHINES
Filed March 18, 1960 4 Sheets-Sheet 3

(LOWERING POSITION)

INVENTOR
Victor Pomper
Robert Gauthier
Louis Pigolet
BY
Barlay, Stephens & Huettig
ATTORNEYS

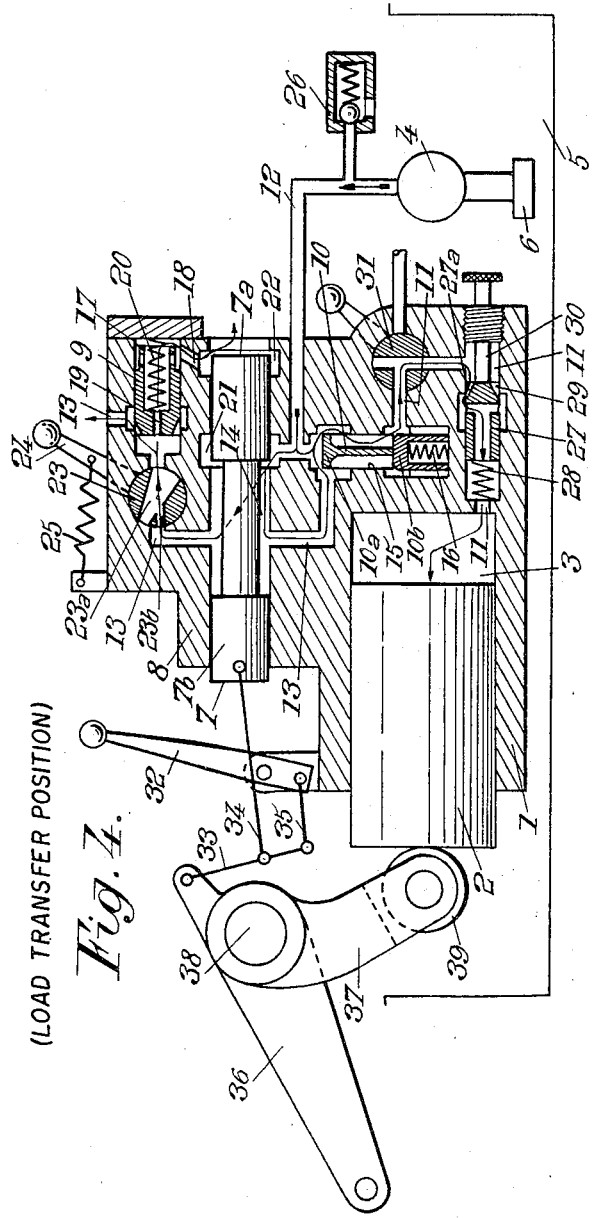

2,964,908
HYDRAULIC CONTROL SYSTEMS FOR AGRICULTURAL MACHINES

Victor Pomper, Paris, Robert Gauthier, Saint Germain au Mont d'Or, and Louis Pignolet, Lyon, France, assignors to Societe Industrielle Generale de Mechanique Appliquee S.I.G.M.A., Paris, France, a society of France Filed Mar. 18, 1960, Ser. No. 15,942
Claims priority, application France Mar. 20, 1959
5 Claims. (Cl. 60—52)

The present invention relates to hydraulic control systems for agricultural tractors, such a system including a one-way ram capable of raising a plow or similar implement, and in particular an implement carried or half-carried by the tractor, the term "half-carried" meaning that the implement is supported on the one hand by the tractor, through link means capable of giving the plow some degree of freedom in the vertical direction, and on the other hand by the ground through an element such as a gauge wheel or a skid. The ram may be controlled either by a follow-up device (i.e. such that the operator merely has to set a control member in a given position to cause the ram to bring the plow into a corresponding position) or by a device such that the positioning of the plow is directly controlled by the operator.

The object of our invention is to provide a hydraulic control system of the above mentioned type which is better adapted to meet the requirements of practice than those known up to this time, and in particular a system which permits of temporarily transferring a portion of the weight of the plow or other implement to the tractor in order to improve adhesion of the rear wheels thereof on the ground.

Such control systems include a one-way hydraulic ram, a permanently driven feed pump for said ram, a distributing valve capable of occupying three positions corresponding respectively to a raising displacement, a lowering displacement and a holding position of the plow, a discharge valve for controlling the outflow of liquid from the pump and from the variable volume space of the ram and a holding valve for the liquid contained in said space, said discharge valve and holding valve being hydraulically controlled by the distributing valve.

According to our invention, the holding valve is made in the form of a three-way valve operative by the delivery pressure of the pump. This valve is capable, according as this pressure is either lower or higher than a given value, of either separating from one another or connecting together the variable volume space of the ram, which communicates with the housing of said holding valve, the delivery conduit of the pump, which leads to said housing, and a discharge conduit starting from said housing and in which the discharge valve is mounted. A by-pass conduit is provided between said pump delivery conduit and the portion of said discharge conduit located between said holding valve and said discharge valve, and said distributing valve is arranged in such manner that, in a first position, it causes the discharge valve to be closed and clears said by-pass conduit, that, in a second position, it opens said discharge valve while keeping said by-pass conduit open and that, in a third position, it opens said discharge valve and closes said by-pass conduit.

A preferred embodiment of the present invention will be hereinafter described with reference to the accompanying drawings, given merely by way of example and in which:

Figs. 1 to 4 diagrammatically show, partly in vertical elevation and partly in section, a hydraulic control system according to our invention respectively in raising position, holding position, lowering position and load transfer position.

Figure 2:
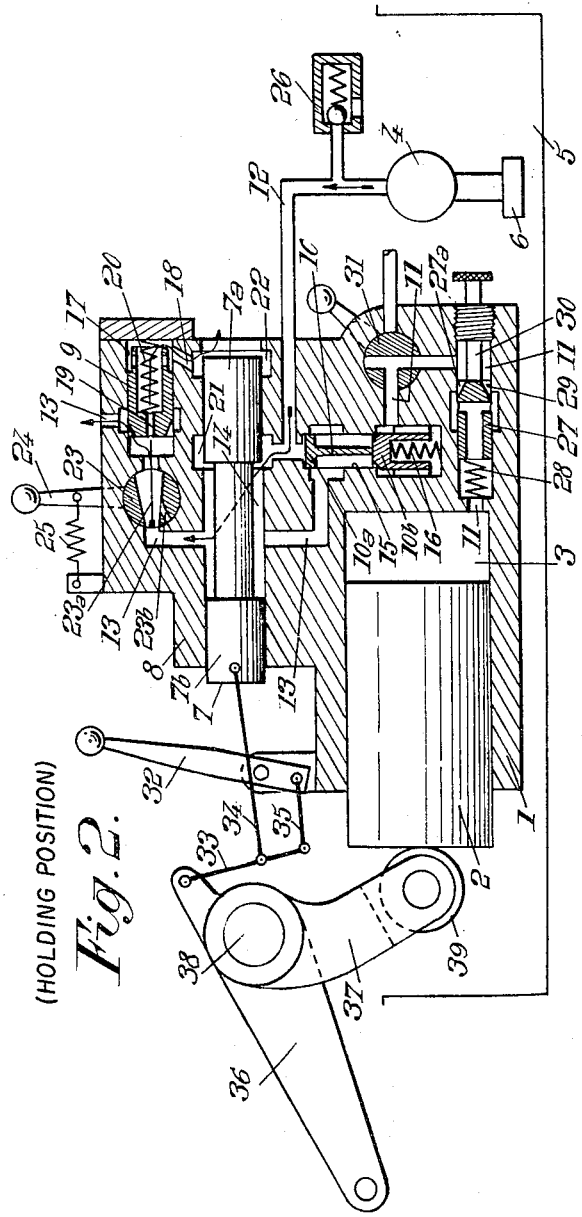
Figure 3:
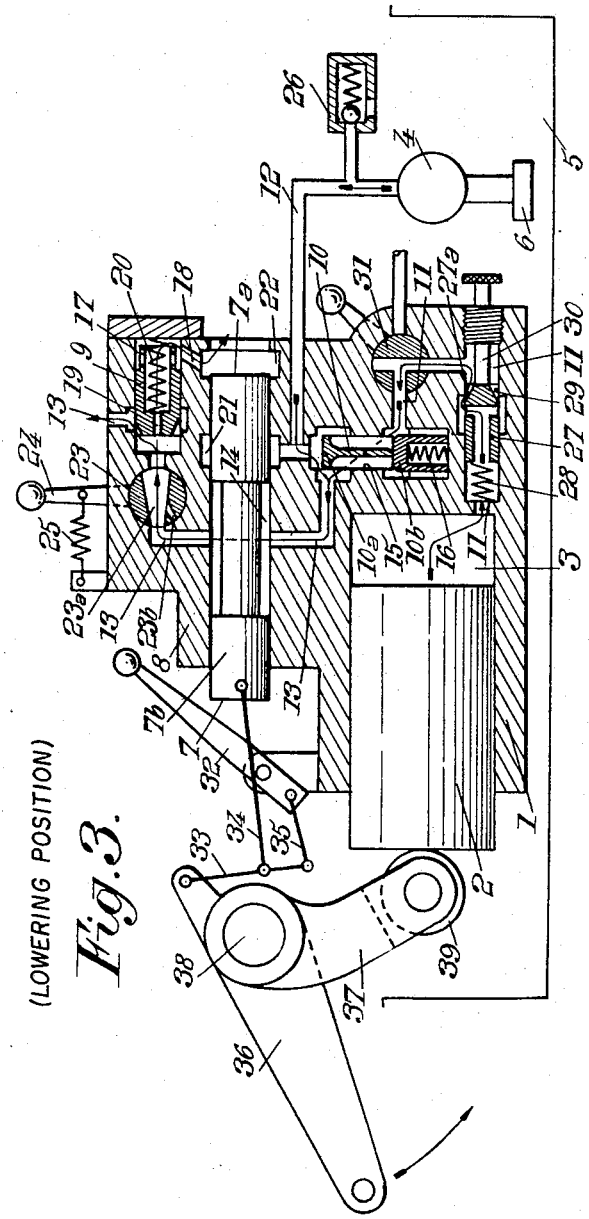

The hydraulic control system comprises:

A one-way hydraulic ram including a fixed cylinder 1 and a piston 2 limiting therein a variable volume space 3;

A permanently driven feed pump 4 having its intake located in a tank 5 with the provision of a filter 6, the delivery conduit of said pump being shown at 12;

A distributing slide valve 7 movable in a fixed body 8 and capable of occupying three positions, as shown by Figs. 1, 2 and 3 respectively; and A discharge valve 9 for the liquid flowing from pump 4 and possibly for that flowing from space 3 and a holding valve 10 for the liquid contained in said space 3, these two valves 9 and 10 being hydraulically controlled by the distributing valve.

According to our invention, the holding valve 10 consists of a three-way valve operative by the delivery pressure of the pump and capable, according as this pressure is either below or above a given value, of either preventing any communication between space 3, delivery conduit 12 and a discharge conduit 13 in which the discharge valve 9 is mounted, or of connecting said space 3, conduit 12 and conduit 13 together.

Furthermore, a by-pass conduit 14 is provided between the delivery conduit 12 of the pump and the discharge conduit 13.

Distributing valve 7 is capable of operating as follows:

In a first position (Fig. 1), it causes discharge valve 9 to be closed and thus prevents liquid from flowing out through discharge conduit 13; for this position of the distributing valve, the plow is being raised.

In a second position illustrated by Fig. 2, valve 7 causes discharge valve 9 to open, by-pass conduit 14 remaining open. This corresponds to holding the plow in the position it occupies.

In a third position illustrated by Fig. 3, valve 7 still keeps discharge valve 9 open but closes by-pass conduit 14. This corresponds to a lowering displacement of the plow.

Holding valve 10 is slidable in a cylindrical housing 15 and includes two portions 10a and 10b cooperating with corresponding portions of said housing. Conduit 11 opens into housing 15 below the top edge of the part 10b of valve 10 when said valve is in upper position (Fig. 2) and above said top edge when said valve is in its lower position Figs. 1, 3 and 4). Delivery conduit 12 opens into housing 15 above the part 10a of valve 10. Discharge conduit 13 starts from a portion of housing 15 which is always in communication with the space between parts 10a and 10b of valve 10 and which is in communication with the space above part 10a when valve 10 is in lower position (Figs. 1, 3 and 4) and out of communication with said last mentioned space when valve 10 is in upper position (Fig. 2). A spring 16 of relatively low strength acts upon valve 10 in the upward direction, that is to say against the action of the pressure of the liquid fed through conduit 12. As shown, the intermediate part of valve 10 is of reduced cross section as compared with its end parts 10a and 10b.

Discharge valve 9 is slidably fitted in a chamber 17 so as to divide it into two compartments one of which is in communication with discharge conduit 13 whereas the other is provided with a leak channel 18, these two compartments being permanently in communication through a passage 19 of small cross section which, in the example shown, is provided in valve 9 itself. A spring 20 urges valve 9 toward the left (as shown by Fig. 1) when channel 18 is closed by the portion 7a of the distributing valve 7. In this position of valve 9, discharge conduit 13 is cut off from the outside. On the contrary, when channel 18 is opened, the pressure in the compartment of chamber 17 provided with this channel 18 is suddenly reduced and the pressure in the other compartment of chamber 17 pushes valve 9 toward the right so that discharge conduit 13 is in communication with the outside and liquid flows out freely therethrough.

Advantageously, as shown, by-pass conduit 14 consists of an annular space provided around the central portion of distributing valve 7, this annular space communicating directly at one end with discharge conduit 13 whereas its other end opens into annular chamber 21 in communication with delivery conduit 12.

The portion 7b of valve 7 is capable, in the position shown by Fig. 1, of closing a groove 22 extending between channel 18 and the outside. In the position of Fig. 2, this part 7a of the distributing valve clears this groove 22 and annular chamber 21, whereas, in the position of Fig. 3, groove 22 is still open but annular chamber 21 is cut off from by-pass conduit 14.

Advantageously, means are provided for throttling at will the portion of discharge conduit 13 between by-pass conduit 14 and discharge valve 9. In the example shown by the drawing, such means consist of a rotating member 23 provided with a passage 23a of large cross section and with a passage 23b of small cross section, this member 23 being operated by means of a lever 24 so as to make it possible to insert the small cross section passage 23b in discharge conduit 13, against the action of a spring 25 which urges lever 24 toward the position where the large cross section passage 23a is inserted in conduit 13.

Advantageously, as shown, a safety valve 26 is provided in delivery conduit 12.

The control system shown by the drawing further comprises a slowing down valve 27 mounted in conduit 11 with the interposition of a spring 28, this valve being capable of opening widely when liquid flows through conduit 11 toward space 3 (as shown by Fig. 1) and of exerting a throttling action when liquid flows out from said space 3 (as shown by Figure 3). As visible on the drawings, the throttled passage is provided between a wall 29 of the housing in which valve 27 is slidably mounted and a portion of said valve which is of varying cross section, this varying cross section being obtained by means of oblique slots 27a provided in the valve. A variable abutment is mounted to cooperate with said valve, this abutment consisting of a threaded rod 30.

Conduit 11 is advantageously provided, between valves 10 and 27, with a three-way cock 31 to permit feeding of liquid to an auxiliary hydraulic ram (not shown).

In the example shown, slide valve 7 is operated through a follow-up device. This device includes a control lever 32 and links 33, 34 and 35. One end of link 33 is pivoted to the arm 36 which serves to hold the plow or other implement. An intermediate point of this link 33 is pivotally connected to part 7b of slide valve 7. The other end of link 33 is pivotally connected to one end of link 35, the other end of which is pivotally connected to the lower end of lever 32. Arm 36 belongs to a lever pivoted about axis 38 and one end of which bears through a roller 39 against the outer end of piston 2.

The control system above described works as follows:

In order to raise the plow, lever 32 is moved toward the left (position shown by Fig. 1), then released (this lever 32 being kept in the position where it has been placed by any suitable friction device). As a result of this displacement of lever 32, links 33, 34 and 35 move slide valve 7 toward the right so that said slide valve closes groove 22. The pressure then becomes equal on opposite sides of passage 19 provided in discharge valve 9. Spring 20 can therefore move said valve 9 into the position where it closes discharge conduit 13 so that the oil delivered by the pump can no longer escape from said conduit 13. The pressure rises in the pump delivery conduit 12 and moves holding valve 10 in the downward direction so that said oil can flow past valve 10 into the space 3 of the ram after having pushed valve 27 toward the left.

Piston 2 therefore moves toward the left and arm 36, which is in contact with said piston through roller 39, rotates upwardly in the direction of the arrow of Fig. 1. This movement is transmitted to links 33, 34 and 35 which move slide valve 7 toward the left. When, as a result of this movement of said valve, groove 22 is again opened, discharge valve 9 is pushed back toward the right. The pressure drops in the oil circuit and holding valve 10 comes back into contact with its seat, thus cutting off communication with space 3 so that piston 2 and arm 36 are fixed in their new respective positions.

Fig. 2 shows the operation of the system when lever 32 is in the position for holding the implement (i.e. arm 36) in fixed position. Pump 4 draws oil from tank 5 and delivers it through conduit 12, passage 14, passage 23a and discharge conduit 13, discharge valve 9 being in the open position since channel 18 opens into groove 22 which is then open to exhaust. Thus a small portion of the oil can flow back to the tank through passage 19 and channel 18. Holding valve 10 is applied against its seat and piston 2 is fixed in position since the oil contained in space 3 is prevented from escaping by the closing of valve 10. Safety valve 26 protects the pump and the oil circuit.

In order to lower the plow, lever 32 is moved toward the right (as shown by Fig. 3), then released (said lever being kept in this position by the above mentioned friction device). Links 33, 34 and 35 move slide valve 7 toward the left so that this slide valve closes chamber 21. The oil pressure rises in delivery conduit 12, thus moving valve 10 downwardly. Pump 4 then delivers oil under a low pressure determined by the relatively weak springs 16 and 20 through conduit 13 past discharge valve 9 which is open, whereas oil flows out from space 3 under the action of piston 2, this oil passing through the slots 27a of valve 27 which slows down the movement of piston 2. This oil escapes through conduit 13.

Arm 36 therefore rotates in the downward direction as indicated by the arrow of Fig. 3 so that, under the action of links 33, 34 and 35, slide valve 7 is moved back toward the right. When said slide valve reopens chamber 21, holding valve 10 is returned to its seat and liquid can no longer escape from space 3 so that piston 2 remains in the position it then occupies.

Care is taken, before this lowering operation, to adjust the opening of valve 27 by operating threaded rod 30.

It should be noted that, in the holding position (Fig. 2), arm 36 can rotate freely in the upward direction but cannot rotate downwardly beyond the position corresponding to that in which lever 32 has been set, holding valve 10 being then applied upon its seat so as to prevent movement of piston 2. Possible upward movements of arm 36 cause slide valve 7 to move toward the left, which displaces valve 10 away from its seat. Said valve 10 is again applied upon its seat as soon as arm 36 comes back to the position corresponding to that of lever 32.

When the plow is provided with a gauge wheel, said plow may be allowed to "float" freely by bringing lever 32 at the limit position toward the right (Fig. 3). In this case, holding valve 10 is always at a distance from its seat and the oil discharged by piston 2 can escape freely. Arm 36 can therefore rotate freely both upwardly and downwardly according to the slope of the ground. If it happens to come into the lowermost position corresponding to the position of lever 32, holding valve 10 is temporarily applied upon its seat.

In order to transfer load from the plow to the tractor, slide valve 7 being in the holding position and the plow resting either wholly upon the ground through its gauge wheel or partly thereon through its share if there is no gauge wheel, lever 24 is displaced toward the right (Fig. 4), which gradually throttles passage 23a and substitutes the small section passage 23b. The oil pressure rises in the circuit and becomes sufficiently high to move holding valve 10 away from its seat and to act upon piston 2 which undergoes a thrust sufficient to pull on the plow and thus to transfer a portion of the weight thereof to the tractor in order to increase adhesion of the wheels of said tractor on the ground. Passage 23b limits this pressure and thus prevents the share from raising above the ground. When lever 24 is released, it is returned into its normal position by spring 25.

Load transfer can also be obtained when slide valve 26 is in floating position, that is to say is in its limit position for lowering the plow. In this case, holding valve 10 being permanently open, the insertion of throttling passage 23b in the discharge conduit causes, as in the preceding case, the oil pressure to rise in space 3, thus causing the desired load transfer. This advantage is maintained in the case of the holding valve 10 being temporarily opened by an upward rotation of arm 36 due to a sharp sloping of the ground.

The above described control system is of very simple construction and one of its advantages is that it permits housing throttling member 23 and discharge valve 9 in the same bore. Load transfer is always possible whatever be the position of arm 36.

In a general manner, while we have, in the above description, disclosed what we deem to be a practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. A hydraulic control system for an agricultural tractor which comprises, in combination, an actuating or load sustaining one way hydraulic ram including a cylinder and a piston movable in said cylinder and limiting therein a variable volume space filled with liquid, a continuously driven liquid pump, means forming a valve housing, a hydraulic circuit including a ram control conduit connecting said ram cylinder space with a point of said housing, a delivery conduit connecting the delivery of said pump with a second point of said housing, a discharge conduit leading out from a third point of said housing and a by-pass conduit extending from said delivery conduit to said discharge conduit, a piston valve fitting slidably in said housing and capable, in a closing position thereof, of preventing any communication between said three points of said housing, resilient means operatively connected with said valve for urging it toward said closing position, said piston valve being capable, in response to a sufficient pressure applied thereon by the liquid fed from said pump through said delivery conduit, of coming into an opening position where it places said three points in communication together, a distributing valve mounted to cooperate with said by-pass conduit for opening or closing it according to the position of said distributing valve, a discharge slide valve mounted in said discharge conduit to control the liquid flow therethrough, said discharge slide valve being hydraulically controlled by said distributing valve to close said discharge conduit for a range of positions of said distributing valve where it clears said by-pass conduit and to open said discharge conduit for a consecutive range of positions of said distributing valve including the remainder of the positions where it clears said by-pass conduit and the positions where it closes said by-pass conduit.

2. A control system according to claim 1 further including, in the portion of said discharge conduit extending between its point of connection with said by-pass conduit and said discharge valve, means for throttling said portion of said discharge conduit.

3. A control system according to claim 1 in which said piston valve housing is of cylindrical shape, said delivery conduit and said ram control conduit opening respectively into the opposed ends of said housing, said piston valve including two cylindrical end portions fitting slidably in said housing and a middle portion of a cross-section smaller than that of said cylindrical housing, said resilient means consisting of a spring urging said piston valve toward the end of said housing into which said delivery circuit opens, said discharge conduit starting from the cylindrical wall of said housing at a small distance from said last mentioned end thereof.

4. A hydraulic control system for an agricultural tractor which comprises, in combination, an actuating or load sustaining one way hydraulic ram including a cylinder and a piston movable in said cylinder and limiting therein a variable volume space filled with liquid, a continuously driven liquid pump, means forming a cylindrical valve housing, a ram control conduit connecting said ram cylinder space with a point of said housing, a delivery conduit connecting the delivery of said pump with a second point of said housing, a discharge conduit leading out from a third point of said housing, a piston valve fitting slidably in said housing and capable, in a closing position thereof, of preventing any communication between said three points of said housing, resilient means operatively connected with said valve for urging it toward said closing position, said piston valve being capable, in response to a sufficient pressure applied thereon by the liquid fed from said pump through said delivery conduit, of coming into an opening position where it places said three points in communication together, means forming a cylindrical housing and, in line with said last mentioned housing an annular chamber forming an extension thereof, said last mentioned housing being transverse to a portion of said discharge conduit and intersecting it and said delivery conduit opening into said annular chamber, a distributing slide valve having two cylindrical end portions fitting slidably in said last mentioned housing and an intermediate portion of smaller cross section than said last mentioned cylindrical housing, the space between said intermediate portion and said last mentioned casing forming a by-pass conduit between said annular chamber and said discharge conduit, means forming an annular groove in line with said chamber and fixed with respect thereto, one of said end portions of said distributing valve fitting slidably in the ends of said annular groove so that said groove is connected with the outside for a range of positions of said distributing valve, in such manner that for a portion of said range of positions said distributing valve leaves said annular chamber in communication with said by-pass conduit whereas for the remainder of said range said distributing valve cuts off said annular chamber from said by-pass conduit, means forming a housing fixed with respect to said discharge conduit, said last mentioned housing communicating at one end with the periphery of said groove and extending across the portion of said discharge conduit extending between said second mentioned housing and the outside or exhaust, a discharge slide valve fitting slidably in said third mentioned housing to control the communication of said discharge conduit with the outside or exhaust, spring means operatively connected with said discharge valve for urging it toward discharge conduit closing position, said discharge conduit being mounted in piston like fashion in its housing so that the liquid pressure in said discharge conduit urges it toward opening position, and means forming a throttled passage connecting together the two portions of said third mentioned housing located on opposite sides of said discharge valve.

5. A control system according to claim 4 further comprising, in said ram control conduit, a slowing down valve capable of opening widely for the flow of liquid toward said ram and of throttling the flow of the liquid in the opposed direction, the throttling action of said slowing down valve being adjustable.

No references cited.